United States Patent [19]

Kanemasa et al.

[11] Patent Number: 4,621,172

[45] Date of Patent: Nov. 4, 1986

[54] FAST CONVERGENCE METHOD AND SYSTEM FOR ECHO CANCELLER

[75] Inventors: Akira Kanemasa; Kunihiko Niwa, both of Tokyo, Japan

[73] Assignee: NEC Corporation, Tokyo, Japan

[21] Appl. No.: 562,846

[22] Filed: Dec. 19, 1983

[30] Foreign Application Priority Data

Dec. 22, 1982 [JP] Japan .................. 57-225167
Jul. 11, 1983 [JP] Japan .................. 58-125814

[51] Int. Cl.⁴ .............................................. H04B 3/20
[52] U.S. Cl. .................................... 370/32.1; 379/411
[58] Field of Search ............... 179/170.2, 170.6, 170.8; 370/32

[56] References Cited

U.S. PATENT DOCUMENTS

| | | | |
|---|---|---|---|
| 3,787,645 | 1/1974 | Ochiai et al. | 179/170.2 |
| 3,789,165 | 1/1974 | Campanella et al. | 179/170.2 |
| 3,821,493 | 6/1974 | Chiba | 179/170.2 |
| 3,973,199 | 8/1976 | Widmer | 325/38 B |
| 4,007,341 | 2/1977 | Sourgens et al. | 179/170.2 |
| 4,288,664 | 9/1981 | Araseki | 179/170.2 |
| 4,334,128 | 6/1982 | Snijders | 179/170.2 |
| 4,349,889 | 9/1982 | van den Elzen | 364/724 |
| 4,353,129 | 10/1982 | Nishiwaki | 375/112 |
| 4,393,367 | 7/1983 | Maruta et al. | 340/347 DD |
| 4,464,746 | 8/1984 | Snijders et al. | 370/32 |
| 4,467,315 | 8/1984 | Maruta et al. | 340/347 DD |

OTHER PUBLICATIONS

"Digital Echo Cancellation for Baseband Data Transmission", N. Verhoeckx et al, I.E.E.E. Transactions on Acoustics Speech and Signal Processing, vol. AS-SP-27, No. 6, Dec. 1979, pp. 768-781.

Primary Examiner—Gene Z. Rubinson
Assistant Examiner—R. Vaas
Attorney, Agent, or Firm—Laff, Whitesel, Conte & Saret

[57] ABSTRACT

An echo canceller for cancelling echoes which result from impedance mismatching in a two-wire/four-wire conversion circuit. The prior art employed an input terminal, an output terminal, a transmitter section, a receiver section, a digital-to-analog converter, an adaptive digital filter, a subtractor, a sample hold circuit, an analog-to-digital converter, a multiplier, a low pass filter, a hybrid circuit, and a two-wire communication path, for the purpose of generating a replica of the echo signal to cancel such echos. A method has also been proposed which employs a polarity discriminator circuit instead of an analog-to-digital converter, and utilizes approximation algorithms to correct an adaptive digital filter tap coefficient using the signs of an error signal. In order to carry out this alternative method, the invention employs a fast convergence system comprising a circuit for generating an echo replica in response to a transmit signal, a circuit for producing a difference signal by subtracting the echo replica from a signal which contains a receiver signal and echo, a circuit for multiplying and averaging the difference signal and a polarity of the echo replica, a circuit for absorbing a fluctuation in an absolute value of the averaged output, and a circuit for adaptively varying a tap correction amount of a filter of the echo canceller in response to an output of the fluctuation absorbing circuit.

3 Claims, 8 Drawing Figures

FAST CONVERGENCE METHOD AND SYSTEM FOR ECHO CANCELLER

BACKGROUND OF THE INVENTION

The present invention relates to an echo canceller for cancelling echoes which result from impedance mismatching in a two-wire/four-wire conversion circuit and, more particularly, to a fast convergence method and system for the echo canceller.

An echo canceller has been used to cancel echoes which sound unpleasant and develop in satellite circuits, long-distance circuits and other telephone circuits which involve substantial transmission delays. It has also been used for simultaneously transmitting two-way data utilizing a voice band (full-duplex modem). Another possible application of an echo canceller is the means for realizing two-wire two-way baseband data transmission which employs pair cables. In this respect, study is now under way to use echo cancellers as one hopeful means for digitizing subscriber-accessed transmission paths of private networks or public networks.

While the following description concentrates on two-wire two-way baseband data communications as an exemplary application of an echo canceller, the present invention is also applicable to an echo canceller for speech or one for modems as will be described.

Figure 1:
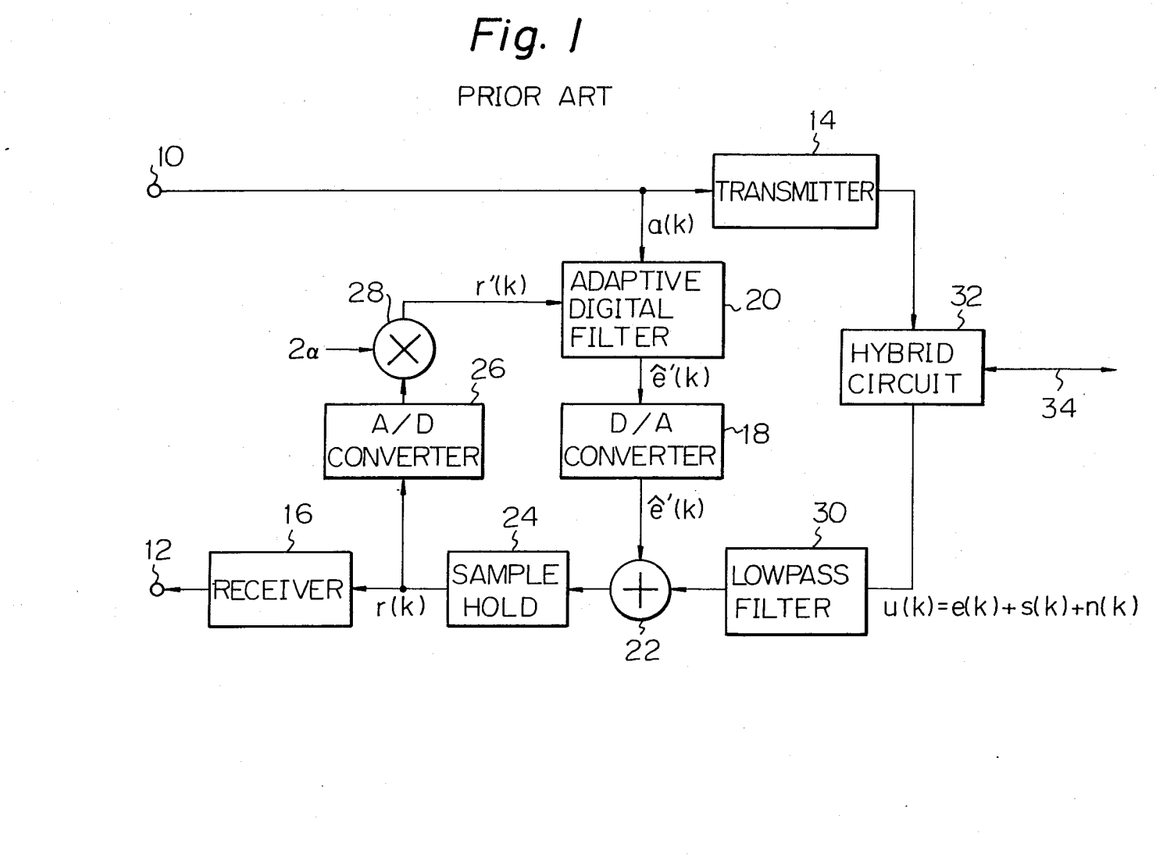
FIG. 1 is a block diagram of a prior art echo canceller.

Referring to FIG. 1 of the drawing, a prior art echo canceller is shown in a block diagram. The echo canceller comprises an input terminal 10, an output terminal 12, a transmitter section 14, a receiver section 16, a digital-to-analog converter (DAC) 18, an adaptive digital filter (ADF) 20, a subtractor 22, a sample hold (SH) circuit 24, an analog-to-digital converter (ADC) 26, a multiplier 28 whose coefficient is $2\alpha$ ($\alpha$ being a constant), a low pass filter (LPF) 30, a hybrid circuit (HYB) 32, and a two-wire communication path 34.

The circuit shown in FIG. 1 is assumed to be connected in opposing manner to another such circuit by a two-wire communication path. Taking subscriber's cables for example, one of the opposite circuits is installed in a switching office and the other in a subscriber's station. Further, for simplicity, the description will proceed assuming the baseband transmission and an echo canceller installed in a subscriber's station. A transmit signal from a subscriber's terminal is applied through the input terminal 10 to the transmitter 14 and ADF 20. The transmit signal is assumed to have been scrambled to have no correlation with a received signal. The transmitter 14 is an interface between the subscriber's terminal and the two-wire communication path 34 and may comprise a unipolar/bipolar converter, a band limit filter, a buffer amplifier or the like. The output of the transmitter 14 is sent out to the transmission path 34 via the hybrid 32. At the same time, the transmitter output is routed to the LPF 30 as echoes due to a failure in the hybrid 32, impedance mismatching or like cause.

Meanwhile, a signal received from the other party (switching office in this case) through the two-wire transmission line 34 and hybrid 32 is also applied to the LPF 30. Assume that an echo signal is e(k) (where k is an index indicative of time), a received signal is s(k), and noise effecting the received signal s(k) in the transmission line 34 is n(k). Then, an output signal u(k) of the LPF 30 is expressed as:

$$u(k)=e(k)+s(k)+n(k) \quad \text{Eq. (1)}$$

Now, an echo canceller is directed to generating a replica $\hat{e}(k)$ of the echo signal e(k) to thereby cancel echoes. In FIG. 1, the closed loop made up of the ADF 20, DAC 18, subtractor 22, sample hold 24, ADC 26 and multiplier 28 is used to adaptively generate the echo replica $\hat{e}(k)$. This gives an output signal of the sample hold 24 as represented by r(k):

$$r(k)=e(k)-\hat{e}(k)+s(k)+n(k) \quad \text{Eq. (2)}$$

where e(k) is an output signal of the DAC 18 which is routed to the subtractor 22. In the Eq. (2), $\{e(k)-\hat{e}(k)\}$ is referred to as the "residual echo". The receiver 16 may comprise a bipolar/unipolar conversion circuit, a Nyquist filter, a line equalizer, a buffer amplifier and the like in accordance with requirements.

Figure 2:
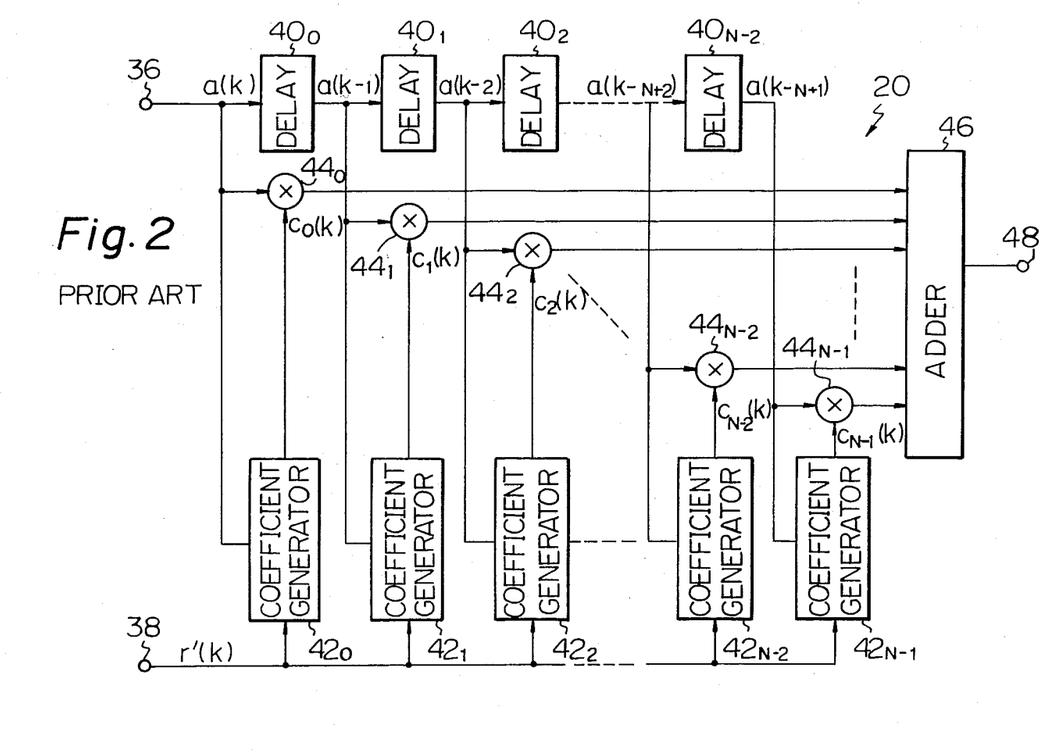
FIG. 2 is a detailed block diagram of an adaptive digital filter included in the prior art echo canceller.

An example of the adaptive digital filter or ADF 20 included in the construction of FIG. 1 is shown in FIG. 2. In FIG. 2, the ADF 20 comprises input terminals 36 and 38, delay elements $40_0, 40_1, 40_2, \ldots, 40_{N-2}$, coefficient generators $42_0, 42_1, 42_2, \ldots, 42_{N-1}$, multipliers $44_0, 44_1, 44_2, \ldots, 44_{N-1}$, an adder 46, and an output terminal 48.

In FIG. 2, the input signal a(k) applied to the input terminal 36, the input signal r'(k) applied to the input terminal 38, and the output signal $\hat{e}'(k)$ appearing at the output terminal 48 correspond respectively to the signals a(k), r'(k) and $\hat{e}'(k)$ which are associated with the ADF 20 shown in FIG. 1. The signal a(k) coming in through the input terminal 36 is fed simultaneously to the delay element $40_0$, multiplier $44_0$ and coefficient generator $42_0$. The delay elements $40_0, 40_1, 40_2, \ldots, 40_{N-2}$ are connected serially in this order and are individually constructed as shown in FIG. 2 at the junctions thereof. That is, the output signal $a(k-m-1)$ of the delay element $40_m$ is applied simultaneously to the delay element $40_{m+1}$, multiplier $44_{m+1}$ and coefficient generator $42_{m+1}$, where m is a natural number.

The signal r'(k) applied to the input terminal 38 is routed to the coefficient generators $42_0, 42_1, 42_2, \ldots, 42_{N-1}$ at the same time. In response to the input signal r'(k) and a(k−m), the coefficient generator $42_m$ produces a coefficient $C_m(k)$ which is delivered to the multiplier $44_m$. The outputs of the N multipliers $44_0, 44_1, 44_2, \ldots, 44_{N-1}$ are summed up by the adder 46 and the sum $\hat{e}'(k)$ is fed to the output terminal 48. In this manner, an echo replica $\hat{e}'(k)$ can be generated from the input signal a(k) on the basis of a value of the error signal r'(k).

The amount of delay effected by the delay elements $40_0, 40_1, 40_2, \ldots, 40_{N-2}$ is equal to the transmit data rate, T second, and which may be realized in practice by means of a flip-flop. In the coefficient generator $42_m$, the coefficient is updated by the steepest descent or like adaptation algorithm in order to make the error signal r'(k) minimum. Basically, the adaptive digital filter shown in FIG. 2 is a transversal filter; when the coefficients have been converged, each coefficient is approximate to the impulse response of an echo bus which is made up of the transmitter 14, hybrid 32 and LPF 30.

In FIG. 2, the coefficient generator $42_m$ performs an operation shown below:

$$c_m(k)=c_m(k-1)+r'(k-1)\cdot a(k-m) \quad \text{Eq. (3)}$$

In the Eq. (3), r'(k) is expressed as:

$$r'(k) = 2\alpha \cdot R[r(k)] \qquad \text{Eq. (4)}$$

where R [·] indicates quantizing r(k) into "n" bits which is performed by the ADC 26. Based on the Eqs. (3) and (4), the tap coefficients $C_m(k)$ of the transversal filter are updated and the adaptation process is performed such that the tap coefficients approach the impulse response of the echo bus with the lapse of time.

The ADC 26 shown in FIG. 1 has heretofore required an accuracy of about eight bits and its size and, therefore, power consumption increases with data rate. This brings about a fear that the ADC 26 obstructs a future effort for realizing a one-chip LSI design of the whole circuitry of FIG. 1. In light of this, there has been proposed a method which employs a polarity discriminator circuit. This alternative method is one of approximation algorithms which corrects an ADF tap coefficient using the signs of the error signal and, for this reason, it is generally referred to as the "sign algorithm". In this instance, the Eq. (4) is rewritten as:

$$r'(k) = 2\alpha \cdot \text{sign}[r(k)] \qquad \text{Eq. (5)}$$

where the symbol [·] means picking up only the sign of r(k). That is, the following equation is assumed to hold:

$$\text{sign}[r(k)] = \begin{cases} +1 & \text{when } r(k) \geq 0 \\ -1 & \text{when } r(k) < 0 \end{cases} \qquad \text{Eq. (6)}$$

In order to attain a signal-to-noise (S/N) ratio equivalent to one provided by the ADC 26 in conjunction with the sign algorithm using the Eqs. (3) and (5), it is necessary to select $\alpha$ in the Eq. (5) such that it is sufficiently smaller than $\alpha$ in the Eq. (4). While the magnitude of $\alpha$ concerned depends upon the received signal level, it should be selected to be about 1/100 in practice. Therefore, as will be apparent from the Eq. (3), the amount of each tap coefficient correction per one iteration is very small, resulting in about hundred times longer convergence time.

SUMMARY OF THE INVENTION

It is therefore an object of the present invention to provide a method and system for shortening a convergence time in an echo canceller which overcomes the drawback inherent in the prior art method and system.

It is another object of the present invention to provide an echo canceller which facilitates one-chip LSI construction.

It is another object of the present invention to provide a generally improved fast convergence method and system for an echo canceller.

In one aspect of the present invention, there is provided a fast convergence method for an echo canceller comprising the steps of generating an echo replica in response to a transmit signal, producing a difference signal by subtracting the echo replica from a signal which contains a received signal and echo, multiplying and then averaging the difference signal and a polarity of the echo replica, and adaptively varying a tap correction amount of a filter which generates the echo replica, in accordance with an absolute value of the averaged output.

In another aspect of the present invention, there is provided a fast convergence system for an echo canceller comprising a circuit for generating an echo replica in response to a transmit signal, a circuit for producing a difference signal by subtracting the echo replica from a signal which contains a received signal and echo, a circuit for multiplying and then averaging the difference signal and a polarity of the echo replica, and a circuit for adaptively varying a tap correction amount of a filter of the echo canceller, in accordance with an absolute value of the averaged output.

In another aspect of the present invention, there is provided a fast convergence system for an echo canceller comprising a circuit for generating an echo replica in response to a transmit signal, a circuit for producing a difference signal by subtracting the echo replica from a signal which contains a received signal and echo, a circuit for multiplying and averaging the difference signal and a polarity of the echo replica, a circuit for absorbing a fluctuation in an absolute value of the averaged output, and a circuit for adaptively varying a tap correction amount of a filter of the echo canceller in response to an output of the fluctuation absorbing circuit.

The above and other objects, features and advantages of the present invention will become apparent from the following detailed description taken with the accompanying drawing.

DESCRIPTION OF THE PREFERRED EMBODIMENTS

While the fast convergence method and system for the echo canceller of the present invention is susceptible to numerous physical embodiments, depending upon the environment and requirements of use, substantial numbers of the herein shown and described embodiments have been made, tested and used, and all have performed in an eminently satisfactory manner.

Figure 3:
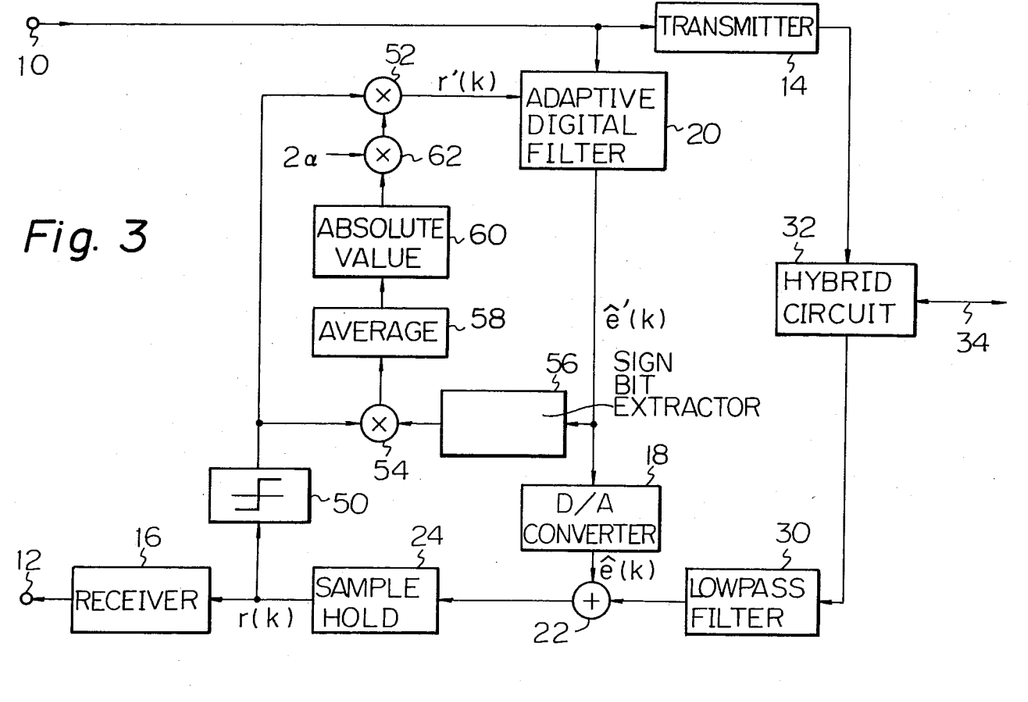
FIG. 3 is a block diagram of an echo canceller embodying the present invention.

Referring to FIG. 3, a preferred embodiment of the present invention is shown in a block diagram. In FIG. 3, the same structural elements as those shown in FIG. 1 are designated by the same reference numerals. Designated by the reference numeral 50 is a polarity discriminator (corresponding to the ADC 26 in FIG. 1 except for the change of the bit number to one bit), and 52 a multiplier for multiplying a correction coefficient which varies adaptively (corresponding to the multiplier 28 in FIG. 1 adapted to multiply a fixed correction coefficient). Further, the reference numeral 54 in FIG. 3 designates a multiplier, 56 a sign bit extractor, 58 an averaging circuit, 60 an absolute value circuit, and 62 a multiplier.

In FIG. 3, the output of the sign discriminator 50 is applied to the multiplier 52 and to the multiplier 54. The sign detector 56 picks up a sign of an echo replica e'(k)

which is an output of the adaptive digital filter or ADF 20. The echo replica sign is multiplied by an output of the polarity discriminator 50. The product is applied to the averaging circuit 58. The output of the averaging circuit 58 is fed to the absolute value circuit 60 to obtain an absolute value thereof. The multiplier 62 multiplies an output of the absolute value circuit 60 by a constant $2\alpha$ thereby weighting the constant $2\alpha$. Further, the multiplier 52 multiplies an output of the discriminator 50 and that of the multiplier 62 and the resulting error signal r'(k) is routed to the ADF 20. An averaging circuit 58 is found in the averaging network 19 as shown in FIG. 1 of U.S. Pat. No. 3,973,199, entitled "PREDICTION DIFFERENTIAL PULSE CODE MODULATION SYSTEM WITH ADAPTIVE COMPOUNDING", issued to Widmer.

In contrast to the prior art method which maintains the tap correction coefficients constant, the method of the present invention is derived from the fact that the error signal and the sign of the echo signal have a correlation and the magnitude of the correlation output varies in dependence upon the residual echo level. This allows the tap correction coefficients to be varied adaptively in response to a residual echo level and, thereby, remarkably shortens the convergence time. Among conditions indispensable for embodying the principle of the present invention, extraction of the sign of an echo signal is impracticable in actual systems. The present invention has been achieved paying attention to the fact that, considering the adaptation process of an echo canceller, it is reasonable to expect that the sign of an echo signal and that of an echo replica coincide with each other after the convergence has proceeded to a certain extent.

To simplify the description of the operation, let it be assumed in FIG. 3 that the ADF 20 has one tap. While the transmission path code format is assumed to be AMI (alternate mark inversion), operations with other code formats and with a multi-tap adaptive digital filter will be described later in detail. In FIG. 3 which shows one embodiment of the present invention, use is made of a polarity discriminator of a small hardware scale as an identifier circuit. It will be needless to mention that the principle of operation and effects attainable therewith also apply to a construction which employs an A/D converter or a multi-value identifier circuit.

Because the path code format is assumed to be AMI and one tap is assumed for the echo, the echo e(k) has three levels as produced by:

$$e(k) = \{+e, 0, -e\} \qquad \text{Eq. (7)}$$

where e is a positive number, the probabilities occurrence of $+e$ and $-e$ are commonly $\frac{1}{4}$, and that of 0 is $\frac{1}{2}$. Neglecting fluctuations due to intersymbol interference, a received signal s(k) is also expressed as:

$$s(k) = \{+s, 0, -s\} \qquad \text{Eq. (8)}$$

where s is a positive number, the probabilities of occurrence of $+s$ and $-s$ are commonly $\frac{1}{4}$, and that of 0 is $\frac{1}{2}$. The level of noise n(k) is sufficiently low compared to that of the received signal s(k), so that positive and negative signs thereof occur with a common probability. For this reason, the following description will proceed disregarding the noise n(k), although the same basic operation holds true even if the noise n(k) is taken into account.

With the above conditions in view, the probabilities with which the positive and negative inputs to the averaging circuit 58 occur may be considered with respect to the following three different cases.

(1) When the residual echo level is higher than the received signal level ($|s(k)| < |e(k) - ê(k)|$):

In this case, except for the condition $e(k) = ê(k) = 0$, the output of the polarity discriminator 50 is determined by the sign of the difference $e(k) - ê(k)$. This, coupled with the operation of the multiplier 54 which multiplies the sign of an echo replica e'(k) and an output of the polarity discriminator 50, maintains the input to the averaging circuit 58 always positive in sign. Its probability is $\frac{1}{2}$. Meanwhile, when $e(k) = ê(k) = 0$ holds, the output of the sign detector 56 is zero and, therefore, the input to the averaging circuit 58 is zero. Its probability is $\frac{1}{2}$.

In total, therefore, the probability of occurrence of the positive sign as an input to the averaging circuit 58 is $\frac{1}{2}$, and that of zero is $\frac{1}{2}$.

(2) When the residual echo level is lower than the received signal level and larger than the tap correction amount ($|r(k)| < |e(k) - ê(k)| < |s(k)|$):

If $s(k) \neq 0$, the output of the polarity discriminator 50 is dictated by the sign of s(k). In this situation, the output of the polarity discriminator 50 and the sign of the echo replica e'(k) are not correlated so that, concerning the input to the averaging circuit 58, the probability of occurrent of the positive sign is $\frac{3}{8}$, that of the negative sign is $\frac{3}{8}$, and that of zero (probability of $e(k) = ê(k) = 0$) is $\frac{1}{4}$. On the other hand, when $s(k) = 0$, the output of the polarity discriminator 50 is determined by the sign of $e(k) - ê(k)$. Under this condition, the output of the polarity discriminator 50 and the sign of the echo replica e'(k) are correlated with each other, and, therefore, the input to the averaging circuit 58 is positive with the probability of $\frac{1}{4}$, and zero with the probability of $\frac{1}{4}$ (probability of $e(k) = ê(k) = 0$).

Thus, the input to the averaging circuit 58 is positive with the probability of $\frac{3}{8}$, negative with the probability of $\frac{3}{8}$, and zero with the probability of $\frac{1}{4}$.

(3) When the residual echo level is smaller than the received signal level and substantially equal to the tap correction amount ($|r(k)| \simeq |e(k) - ê(k)| < |s(k)|$):

If $s(k) \neq 0$, the situation may be regarded in exactly the same manner as in the situation (2) described above. That is, the input to the averaging circuit 58 is positive with the probability of $\frac{3}{8}$, negative with the probability of $\frac{3}{8}$, and zero with the probability of $\frac{1}{4}$. If $s(k) = 0$, then the output of the polarity discriminator 50 is determined by the sign of the difference $e(k) - ê(k)$. Here, the tap correction amount r(k) and the level of $e(k) - ê(k)$ are substantially equal to each other and, hence, no correlation exists between the output of the comparator 50 and the sign of ê'(k). As a result, the input to the averaging circuit 58 has a $\frac{1}{8}$ probability of being positive, a $\frac{1}{8}$ probability of being negative, and a $\frac{1}{4}$ probability of being zero.

In total, therefore, the input to the averaging circuit 58 is positive with the probability of $\frac{1}{4}$, negative with the probability of $\frac{1}{4}$, and zero with the probability of $\frac{1}{2}$.

The results described so far are shown in Table 1.

TABLE 1

| | Probability of input to averaging circuit 58 | | |
|---|---|---|---|
| | (1) $\|s(k)\| < \|e(k) - \hat{e}(k)\|$ | (2) $\|r(k)\| < \|e(k) - \hat{e}(k)\| < \|s(k)\|$ | (3) $\|r(k)\| \cong \|e(k) - \hat{e}(k)\| < \|s(k)\|$ |
| POSITIVE | 1/4 | 3/8 | 1/4 |
| NEGATIVE | 0 | 1/8 | 1/4 |
| ZERO | 1/2 | 1/2 | 1/2 |

Let is be assumed that the received signal level is lower than the echo level. Assuming that the initial value of the tap coefficients is Co(0)=0, on the start of operation of the echo canceller, the positive and negative signs and zero occur in the input to the averaging circuit 58 of FIG. 3 with the probabilities shown in the column (1) of Table 1. Therefore, positive values appear at the output of the averaging circuit 58 with the corresponding probability. It follows that the absolute value circuit 60, multiplier 62 and multiplier 52 determine a tap correction amount $r'_{(1)}(k)$ corresponding to the column (1) of Table 1.

Due to the adaptation operation of the echo canceller, the residual echo level progressively decreases so that the probabilities of the positive and negative signs and zero in the output of the averaging circuit 58 are shifted to the column (2) of Table 1. This allows the input of the averaging circuit 58 to have the values shown in the column (2) of Table 1, thereby determining a tap correction amount $r'_{(2)}(k)$.

As the adaptation by the echo canceller further proceeds, the probabilities of occurrence of the positive and negative signs and zero in the input of the averaging circuit 58 are shifted to the column (3) of Table 1. The output of the circuit 58, therefore, is provided with values corresponding to those shown in the column (3) of Table 1, determining a tap correction amount $r_{(3)}(k)$. Although dependent upon the averaging manner, regarding a mean value in a short period of time, the following equation generally holds:

$$0 \cong r_{(3)}(k) < r_{(2)}(k) < r_{(1)}(k) \qquad \text{Eq. (9)}$$

This implies that the tap correction amount varies with the residual echo level enabling the convergence time to be shortened. Moreover, the convergence is insured because $r_{(3)}(k) \cong 0$ holds. Because a certain degree of fluctuation in the output of the averaging circuit during convergence needs be taken into account, it is desirable to select a small constant α.

Consideration will now be given to a case in which the received signal level is larger than the echo level. In this condition, the operation starts with the column (2) of Table 1 and then shifts to the column (3). The previously described procedure applies to this case, too.

While the tap coefficient has been assumed to be Co(0) as the initial value of the ADF 20, hereinafter will be discussed the fact that the normal operation occurs even when Co(0)≠0 as well. Assume that the echo e(k) generates 0, +e and −e in response to transmit codes "0", "1" and "−1" respectively, and that their probabilities are 1/2, 1/4 and 1/4 respectively. When Co(0)>0, the same operation as that described in conjunction with the condition Co(0)=0 occurs. It will be apparent, however, that the convergence time is shorter when Co(0)>0 than when Co(0)=0.

When Co(0)<0, the operation up to the instant when Co(0)=0 is reached is represented by the columns (1) and (2) of Table 1 except for the inversion of the probabilities of the positive and negative signs. This is indicated in Table 2 shown below.

TABLE 2

| | Probability of input to averaging circuit 58 when Co(0) < 0 | |
|---|---|---|
| | (1) $\|s(k)\| < \|e(k) - \hat{e}(k)\|$ | (2) $\|r(k)\| < \|\hat{e}(k) - e(k)\| \leq \|s(k)\|$ |
| POSITIVE | 0 | 1/8 |
| NEGATIVE | 1/4 | 3/8 |
| ZERO | 1/2 | 1/2 |

Depending upon the echo level, the magnitude of the initial value of the tap coefficients, and the received signal level, the echo canceller starts the adaptation process from the situation (1) or (2) shown above. At this instant, while the output of the averaging circuit 58 in FIG. 3 becomes negative, only the magnitude thereof is picked up by the absolute value circuit 60. Therefore, the tap correction amounts corresponding to the columns (1) and (2) of Table 2 as previously described are brought into coincidence with those shown in the columns (1) and (2) of Table 1 and, therefore, expressed as $r'_{(1)}(k)$ and $r'_{(3)}(k)$. These tap correction amounts are larger than the amount $r'_{(3)}(k)$ in the case of convergence, enabling the convergence to be sped up.

When the initial value Co(0) of the tap coefficients satisfies the condition (1) in Table 2, the condition (1) is maintained until Co(k)=0 is reached, or it is replaced by the condition (2). When Co(0) satisfies the condition (2), the condition (2) is maintained until Co(k)=0 is reached. In this manner, even when Co(0)<0, Co(k)=0 is rapidly reached by increasing the tap correction amount in accordance with the Table 2; that is followed by exactly the same operation as the operation effected under the condition Co(0)>0. It should be noted, however, that the convergence time is longer when Co(0)<0 than when Co(0)=0.

As described above, convergence is insured without any dependence upon the initial value of the tap coefficients, while the correction amount of the tap coefficient is variable in accordance with the residual echo level. As such, the convergence time can be markedly reduced.

In the embodiment described above, the ADF 20 shown in FIG. 3 has been assumed to have one tap. Where it is equipped with a plurality of taps, on the other hand, the number of cases with respect to which the probabilities of positive, negative and zero inputs to the averaging circuit 58 are analyzed is exponentially increased, compared to the ADF with a single tap. Therefore, the probabilities corresponding to those shown in Table 1 may be regarded as varying substantially continuously. Assuming the number of taps N is an integer not smaller than 2, Table 3 is obtained in correspondence with Table 1.

TABLE 3

Probability of input to averaging circuit 58 in case with plurality of taps

|  | $|s(k)| < |e(k) - ê(k)|$ | $|r(k)| \simeq |e(k) - ê(k)| < |s(k)|$ |
|---|---|---|
| POSITIVE | $1 - 2^{-N}$ | → $(1 - 2^{-N})/2$ |
| NEGATIVE | 0 | → $(1 - 2^{-N})/2$ |
| ZERO | $2^{-N}$ | → $2^{-N}$ |

It will be understood from Table 3 that, even when "N" taps are employed, the probabilities of the positive and negative inputs to the averaging circuit 58 are individually varied in accordance with the residual echo level. This allows the amount of tap coefficient correction to be varied thereby shortening the convergence time. Depending upon the correlation between the echo level and the received signal level, the operation may sometimes start with a value intermediate between the opposite values shown in Table 3. Further, when the symbol of the initial value of the tap coefficient is different from that of the actual echo impulse response, the situation may be considered by inverting the probabilities of the positive and negative signs from the leftmost ones up to certain intermediate ones (not shown in Table 3 because they depend on the initial value). The operation in such a condition may be accounted for in exactly the same manner as in the one-tap case.

The code format for the transmission path has been assumed to be AMI in the foregoing description. While AMI code format is extensively used in actual systems due to the favorable DC balance, a two-level code format such as biphase code format is often used to take advantage of the easy clock extraction particular thereto. In this case, too, Table 3 applies until the residual echo level becomes equivalent to the received signal level. As soon as the residual echo level becomes equivalent to the received signal level, the output of the polarity discriminator 50 is determined by the sign of the received signal level only and, as a result, the echo canceller itself stops performing adaptation. To prevent the echo canceller from so stopping the operation, random noise of the same order as the received signal level may be added to an input to the polarity discriminator shown in FIG. 3 so as to make (received signal + added noise) substantially zero.

Therefore, after the residual echo level has become equivalent to the received signal level, Table 3 needs only be modified taking into account the probability with which the random noise and the received signal cancel each other. Here, it is important to note that the probabilities during convergence in Table 3 are not varied. It follows that the probabilities of the positive and negative inputs to the averaging circuit 58 vary with the residual echo level in the case of the two-level code format as well, allowing the tap correction amount to be varied and, thereby, the convergence time to be shortened.

Although the operation rate of the echo canceller has been assumed to be equal to the data rate for the simplicity of description, it is required in practice to operate an echo canceller at a rate not smaller than two times the data rate in the case of the AMI code format and not smaller than four times in the case of the biphase code format, in correspondence with the transmission path code band in either case. At this instant, the ADF 20, DAC 18, sample hold 24, polarity discriminator 50, and multiplier 52 shown in FIG. 3 need only be operated at a rate which is an integral multiple of the data rate. Meanwhile, it is not always necessary to drive the multipliers 54 and 62, sign bit extractor 56, averaging circuit 58 and absolute value circuit 60 at a rate an integral multiple higher than the data rate and may be operated at the data rate. It will readily occur to those skilled in this art that the operation will not be effected if the threshold involves some offset in the detection of a sign in the sign bit extractor 56 of FIG. 3. The sign bit extractor 56 may be omitted if desired, although the convergence time will become somewhat longer. In FIG. 3, the polarity discriminator 50 may be replaced by a multi-level identification circuit or an analog-to-digital converter.

As a modification to the embodiment of FIG. 3, a construction for full-analog processings may be designed by omitting the DAC 18 and sample hold 24 and replacing the ADF 20 by an adaptive analog filter. Then, the polarity discriminator 50 may be omitted. Further, in FIG. 3, a digital-to-analog converter may be connected to the input of the transmitter 14 and an analog-to-digital converter to the output of the LPF 30, instead of omitting the DAC 18 and sample hold 24, so that the construction features the full-digital processing capability. In such a case, the polarity discriminator 50 may be omitted.

The embodiment shown in FIG. 3 has been described as being applicable to two-wire two-way baseband data transmission. When applied to an echo canceller for speech, the present invention may be practiced without any modification under the conventional condition that the adaptation by the echo canceller be interrupted in the event of double-talk. The present invention is applicable even to an echo canceller for modems if a modem circuit is additionally installed.

Figure 4:
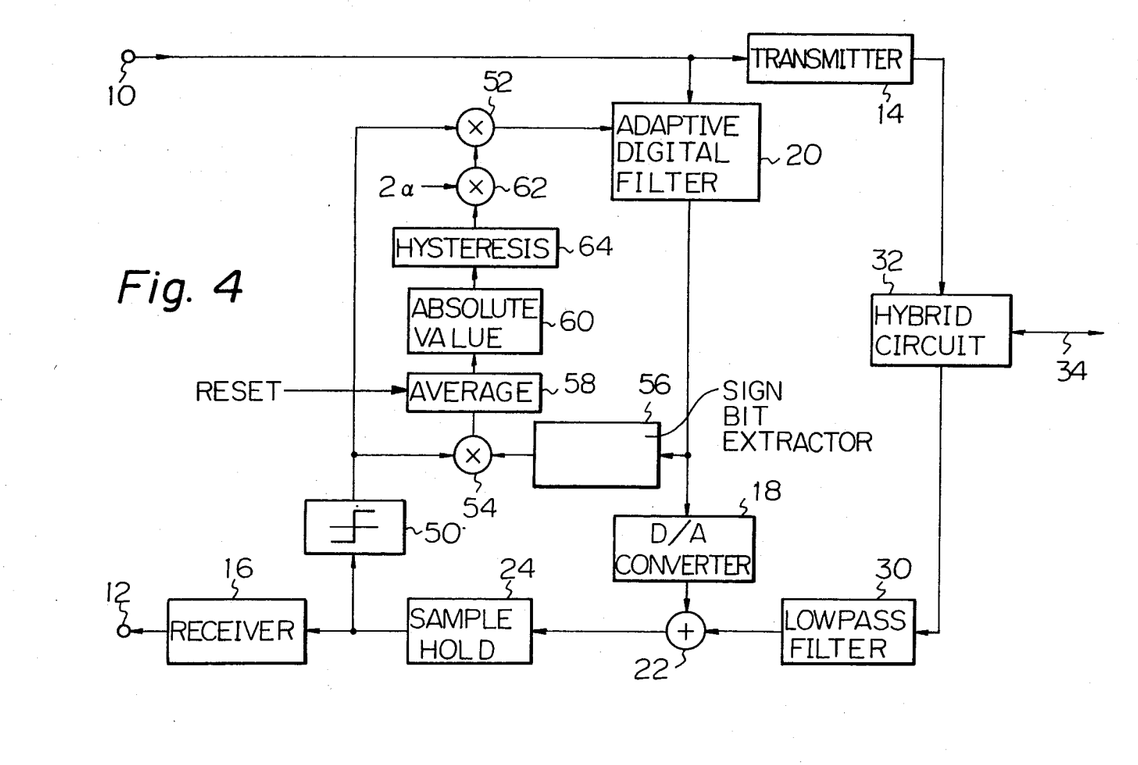
FIG. 4 is a block diagram of another embodiment of the present invention.

Referring to FIG. 4, another embodiment of the echo canceller in accordance with the present invention is shown. A characteristic feature of this embodiment resides in the provision of a hysteresis characteristic circuit 64 in order to prevent the tap correction coefficients in the FIG. 3 embodiment from being fluctuated. The tap correction coefficients of the DAF 20 are adaptively varied utilizing the fact that the output of the sign detector 56 and that of the polarity discriminator 50 hold a correlation therebetween so long as the residual echo level is substantial, but the correlation progressively diminishes in accordance with the decrease in the residual echo level and, ideally, reaches zero in the converged condition. The principle anables the convergence time of an echo canceller to be remarkably shortened.

The correlation operation mentioned above is attainable in FIG. 4 by means of the multiplier 54, averaging circuit 58 and absolute value circuit 60. Under the converged condition of the echo canceller, the output of the absolute value circuit 60 is, ideally, expected to become zero. However, it fluctuates because an ideal correlator cannot be realized in actual circuits. Should the fluctuation have direct influence on the tap correction coefficients, it would magnify the fluctuation of the residual echo in the event of convergence. It is desirable, therefore, that the tap correction coefficients be allowed to undergo a minimum of fluctuation during convergence. This is implemented in accordance with the second embodiment by routing an output of the absolute value circuit 60 to a signal conversion circuit, so that the fluctuation in the output of the absolute value circuit 60 may be suppressed while the echo canceller is in the converged state. In the embodiment shown in FIG. 4, the hysteresis characteristic circuit 64 serves as the signal conversion circuit.

Figure 5:
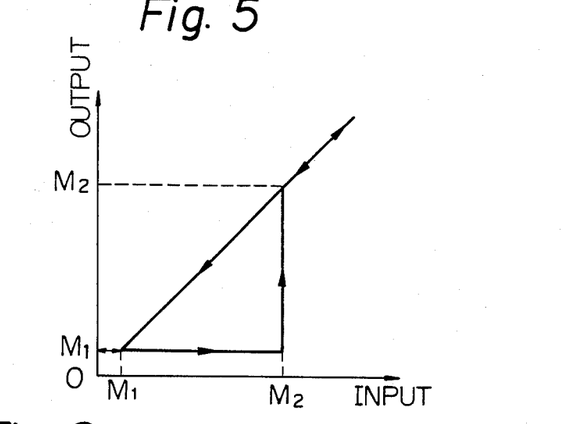
FIGS. 5 and 8 are plots each demonstrating an exemplary input-to-output characteristic of a hysteresis characteristic circuit shown in FIG. 4.

An example of an input to output characteristic of the hysteresis characteristic circuit 64 of FIG. 4 is shown in FIG. 5. In FIG. 5, $M_1$ and $M_2$ are assumed to satisfy a condition $0 \leq M_1 < M_2$; $M_1$ is determined by a system condition concerning the selection of the minimum value of the tap correction coefficients, and $M_2$ by the magnitude of a correlator output in the converged condition of the echo canceller, i.e., that of the fluctuation in the output of the absolute value circuit 60. The input-to-output characteristic shown in FIG. 5 is the typical hysteresis equality and suggests the existence of a range in which two different output signal levels appear depending upon the changing direction of the input signal (increasing or decreasing).

The operation of the hysteresis characteristic circuit 64 shown in FIG. 4 will be described using the plot of FIG. 5. In FIG. 4, the output of the absolute value circuit 60 is routed to the hysteresis characteristic circuit 64. At the time when the echo canceller starts the converging operation, the output of the averaging circuit 58 and, therefore, that of the absolute value circuit 60 has been set to zero by the reset signal shown in the drawing. Upon the start of converging operation, the output of the absolute value circuit 58 is progressively increased. Having the input-to-output characteristic shown in FIG. 5, the hysteresis circuit 64 operates to hold the value $M_1$ despite the increase in the input, until $M_2$ is exceeded. As the time further elapses until the output x of the absolute value circuit 60 exceeds the value $M_2$, the hysteresis characteristic circuit 64 starts passing the input x directly to the output terminal therethrough.

As the convergence proceeds, the output x of the absolute value circuit 60 is progressively reduced to approach zero. In the event the output x has coincided with $M_1$, the output of the hysteresis characteristic circuit 64 is set at $M_1$. Thereafter, so long as the output x of the absolute value circuit 60 satisfies the condition $0 \leq x \leq M_2$, the operation is performed such that the output of the hysteresis characteristic circuit 64 remains $M_1$. In this manner, the hysteresis characteristic circuit 64 is capable of absorbing fluctuations in the output x of the absolute value circuit 60 which usually develop in the event of convergence of an echo canceller.

Figure 6:
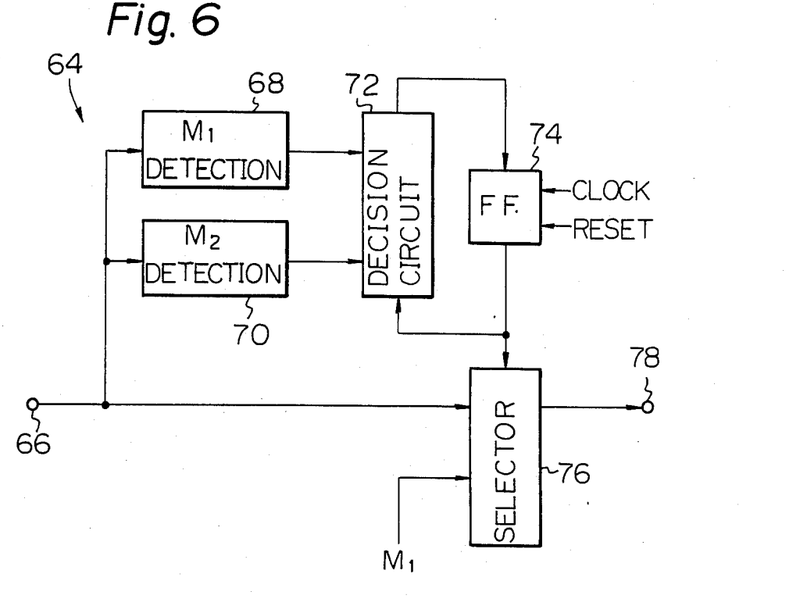
FIGS. 6 and 7 are block diagrams each showing an example of the hysteresis characteristic circuit of FIG. 4.

Referring to FIG. 6, an example of the hysteresis characteristic circuit 64 having the input-to-output characteristic of FIG. 5 is shown. The circuit 64 comprises an input terminal 66, a pattern detector 68 for detecting the value $M_1$, a second pattern detector 70 for detecting the value $M_2$, a decision circuit 72, a flip-flop 74, a selector 76, and an output terminal 78.

The flip-flop 74 is supplied with a clock signal and a reset signal. The clock signal is assumed to be synchronous with the signal x which comes in through the input terminal 66. The signal x is an output of the absolute value circuit 60 shown in FIG. 4. The signal x is applied to the pattern detectors 68 and 70 and to the selector 76. The outputs of the pattern detectors 68 and 70 are routed to the decision circuit 72 which determines specific one of three different ranges in which the value at the input terminal x lies. The three ranges are a first range $0 \leq x < M_1$, a second range $M_1 \leq x < M_2$, and a third range $M_2 \leq x$. Also routed to the decision circuit 72 is an output signal of the flip-flop 74.

The converging process of the echo canceller is considered here. First, at the start of convergence, the signal x applied to the input terminal 66 is assumed to be zero and the flip-flop 74 is assumed to be reset by the reset signal timed to the signal x to produce a (logical) "0" output. The selector 76 is supplied with a first input which is the signal x coming in through the input terminal 66, and a second input which is the value $M_1$. In response to a control signal from the flip-flop 74, the selector 76 selectively delivers the first and second inputs to the output terminal 78.

At the start of the convergence an arrangement is made such that the value $M_1$ appears at the output terminal 78 because the output of the flip-flop 74 is "0". The output of the flip-flop 74 is also applied to the decision circuit 72. As the echo canceller starts the converging operation, the signal x progressively increases. At this instance, if the control signal fed from the flip-flop 74 to the decision circuit 72 is "0", the decision circuit 72 maintains the output thereof "0" until the signal x increases beyond the value $M_2$, which is detected by the pattern detector 70.

The decision circuit 72 is so constructed as to turn its output level from "0" to "1" when the signal x becomes larger than $M_2$. Then, the signal x appears at the output terminal 78. As the convergence by the echo canceller proceeds, the signal x fed to the input terminal 66 progressively diminishes. Under this condition, the control signal fed from the flip-flop 74 to the decision circuit 72 is "1" so that the latter maintains its output level "1" until the signal x decreases beyond the value $M_1$, which is detected by the pattern detector 68. On the decrease of the signal x beyond $M_1$, the output level of the decision circuit 72 turns from "1" to "0" causing the value $M_1$ appear at the output terminal 78. In the manner described, the circuitry shown in FIG. 6 realizes the input-to-output characteristic plotted in FIG. 5. The pattern detectors 68 and 70 may be constituted by the pattern detecting circuit 20 as illustrated in FIG. 1 of U.S. Pat. No. 4,288,664, entitled "NEUTRALIZATION SIGNAL DEVELOPING DEVICE FOR AN ECHO SUPPRESSOR", issued to Araseki. The selector 76 may utilize the selecting circuit 15 illustrated in FIG. 1 of U.S. Pat. No. 4,353,129, entitled "DIGITAL DATA TRANSMISSION SYSTEM", issued to Nishiwaki.

Figure 7:
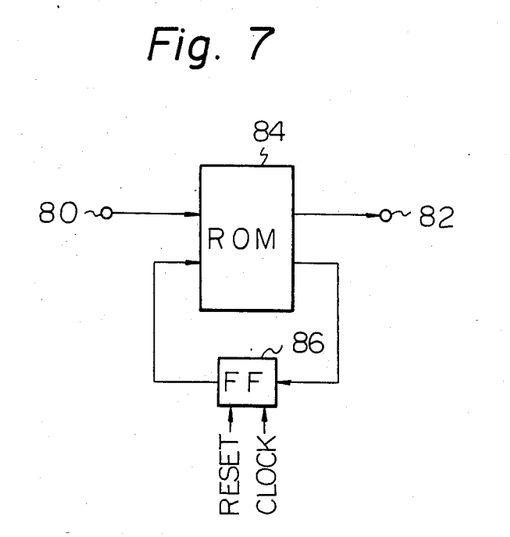

Another example of the circuit having the input-to-output characteristic shown in FIG. 5 is shown in FIG. 7. In FIG. 7, the circuit comprises an input terminal 80, an output terminal 82, a read only memory (ROM) 84, and a flip-flop 86.

The signal x represented by parallel n bits (n being a positive integer) is applied to the input terminal 80 to form part of the addresses of the ROM 84. The flip-flop 86 corresponds to the flip-flop 74 shown in FIG. 6 and is adapted to store a control signal of one bit. The flip-flop 86 is supplied with a clock signal and a reset signal, the clock signal being synchronous with the signal x. The output of the ROM 84 is applied to the flip-flop 86, while the output of the flip-flop 86 is fed back to the ROM 84 as one bit of the addresses. Writing a bit pattern in the ROM 84 allows a circuit with the characteristic of FIG. 5 to be realized with ease, thereby enabling a parallel m-bit (m being a positive integer) output to appear at the output terminal 82. It should be noted that when the hysteresis characteristic circuit 64 of FIG. 4 has the characteristic of FIG. 5, the tap correction coefficients in the converged condition of the echo canceller are maintained constant.

It is also possible to stabilize the convergence of the echo canceller by allowing a minimum of fluctuation to occur in the tap correction coefficients under the convergence. In such a case, the hysteresis characteristic circuit 64 shown in FIG. 4 may be realized with the hysteresis characteristic such as one shown in FIG. 8. The characteristic shown in FIG. 8 may be regarded as consisting of three parts (I), (II) and (III). In the converged state of the echo canceller, the variation rate of the output decreases relative to that of the input because the input in FIG. 8 lies in the part (II) and the gradient thereof is expected to be relatively small. This is successful to suppress the fluctuation of the tap correction coefficients.

Figure 8:
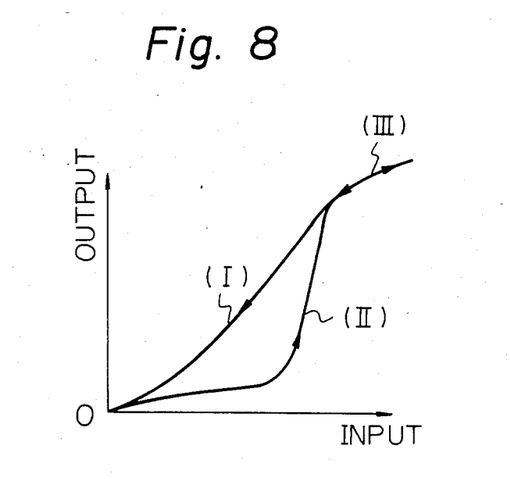

The input-to-output characteristic shown in FIG. 8 is readily attainable by writing data corresponding to the specific characteristic into the ROM 84 which is included in the construction of FIG. 7. From the standpoint of suppressing the fluctuation in the tap correction coefficients as far as possible in the converged state of the echo canceller, it is also possible to stabilize the convergence by use of an ordinary non-linear input-to-output characteristic in place of the hysteresis characteristic. The non-linear characteristic may be set up by, for example, omitting the part (I) of the FIG. 8 characteristic and making the arrow in the part (II) bidirectional. Such a characteristic may be realized by removing the flip-flop in FIG. 7 and writing data matching with the specific characteristic into the ROM 84.

For the simplicity of description, the foregoing description has focused to the operation rate of the echo canceller which is equal to the data rate. In practice, however, an echo canceller has to be operated in conformity with the transmission path code band, i.e., at a rate not smaller than double the data rate in the case of the AMI code format and at a rate not smaller than four times the data rate in the case of the by-phase code format. In this instance, in FIG. 4, the ADF 20, DAC 18, sample hold 24, polarity discriminator 50 and multiplier 52 need only be operated at a rate which is an integral multiple of the data rate.

It will be understood that the sign bit extractor 56 of FIG. 4 operates in the normal manner if the threshold value involves some offset. If desired, the code detector 56 may be omitted altogether. Also, in FIG. 4, the polarity discriminator 50 may be replaced by a multi-level identification circuit or an analog-to-digital converter.

In a modification to the construction shown in FIG. 4, the DAC 18 and sample hold 24 may be omitted and the ADF 20 replaced by an adaptive analog filter, in order to design a full-analog processing construction. Then, the polarity discriminator 50 may be omitted. Furthermore, in FIG. 4, a full-digital design is achievable by omitting the DAC 18 and sample hold 56 and adding an ADC to the output of the LPF 30, in which case the polarity discriminator 50 is omissible.

In summary, it will be seen that the present invention shortens the convergence time required for an echo canceller by increasing the tap correction amount at the start of operation because the residual echo level of that instant is large, and decreasing it as the convergence proceeds in accordance with the decreasing residual echo level. Additionally, the present invention promotes one-chip LSI designs of echo cancellers to trim the costs and dimensions thereof, because a polarity discriminator is used in place of an analog-to-digital converter in order to convert an error signal into a digital signal.

Various modifications will become possible for those skilled in the art after receiving the teachings of the present disclosure without departing from the scope thereof.

What is claimed is:

1. A fast convergence method for providing echo cancellation comprising the steps of:
    (a) generating an echo replica in response to a transmit signal;
    (b) producing a difference signal by subtracting the echo replica from a signal which contains a received signal and an echo;
    (c) multiplying a polarity of the difference signal and a polarity of the echo replica to produce a multiplied output;
    (d) averaging the multiplied output to produce an averaged output; and
    (e) adaptively varying a tap correction amount of a filter which generates the echo replica, in accordance with an absolute value of the averaged output.

2. A fast convergence system for echo cancellation comprising a:
    means for generating an echo replica in response to a transmit signal;
    means for producing a difference signal by subtracting the echo replica from a signal which contains a received signal and an echo;
    means for multiplying a polarity of the difference signal and a polarity of the echo replica to produce a multiplied output;
    means for averaging the multiplied output to produce and averaged output; and
    means for adaptively varying a tap correction amount of a filter of the echo cancellation system, in accordance with an absolute value of the averaged output.

3. A fast convergence system for an echo canceller comprising:
    means for generating an echo replica in response to a transmit signal;
    means for producing a difference signal by subtracting the echo replica from a signal which contains a received signal and an echo;
    means for multiplying a polarity of the difference signal and a polarity of the echo to produce a multiplied output;
    means for averaging the multiplied output to produce and averaged output;
    means for weighting a constant in response to the averaged output to produce a weighted output; and
    means for adaptively varying a tap correction amount of a filter of the echo canceller in response to the weighted output and the difference signal.

* * * * *